Nov. 25, 1924.
F. A. LUNDQUIST
SELECTOR AND CONNECTIONS
Filed Sept. 27, 1920
1,516,539
10 Sheets-Sheet 1
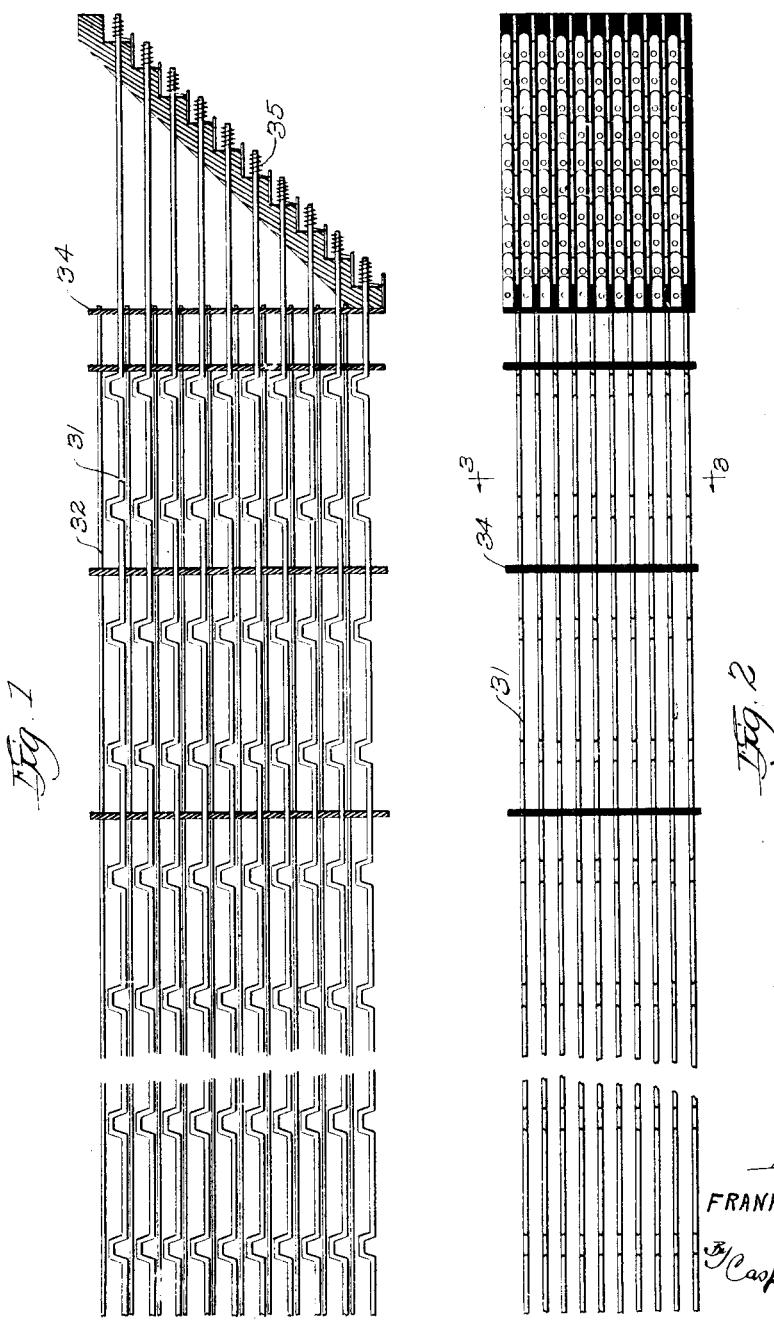
Inventor
FRANK A. LUNDQUIST Nov. 25, 1924.
F. A. LUNDQUIST
SELECTOR AND CONNECTIONS
Filed Sept. 27, 1920  10 Sheets-Sheet 2
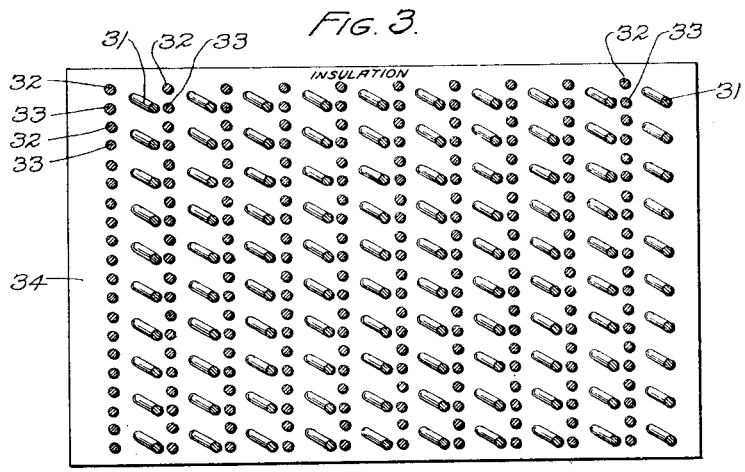
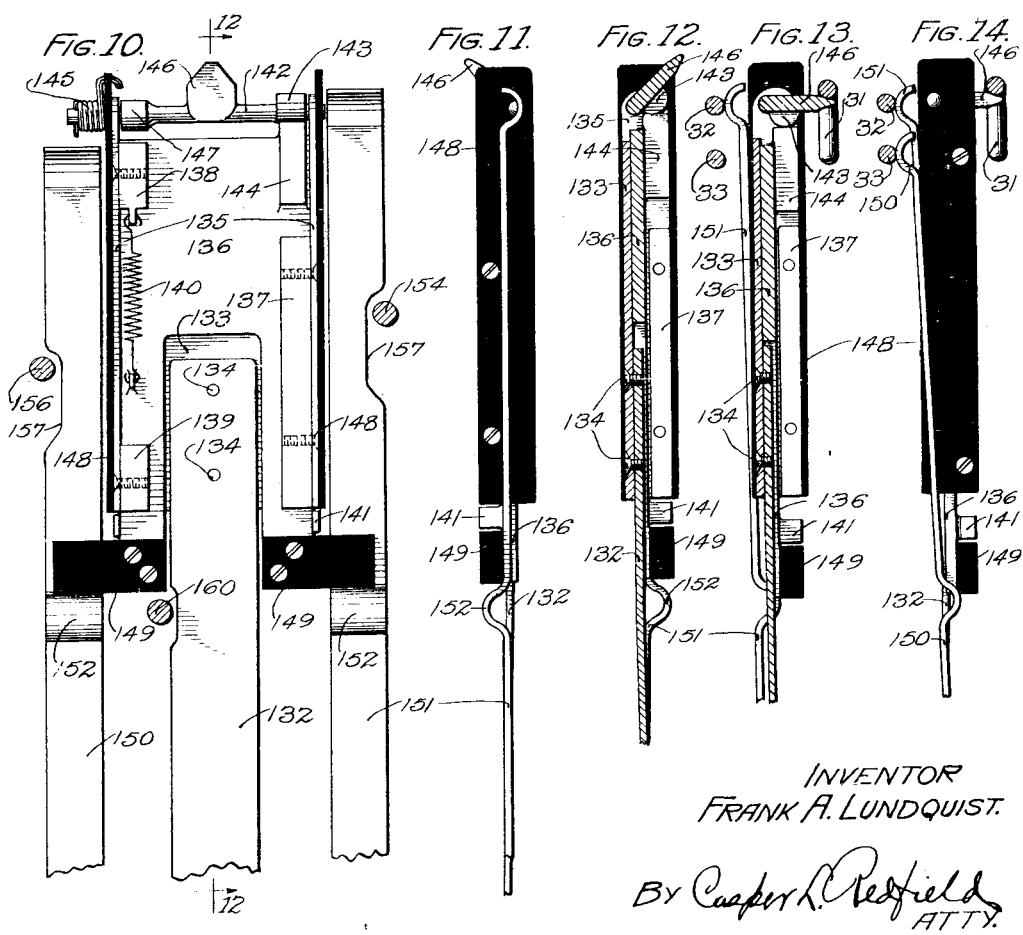
INVENTOR
FRANK A. LUNDQUIST.
By Casper L. Redfield
ATTY.

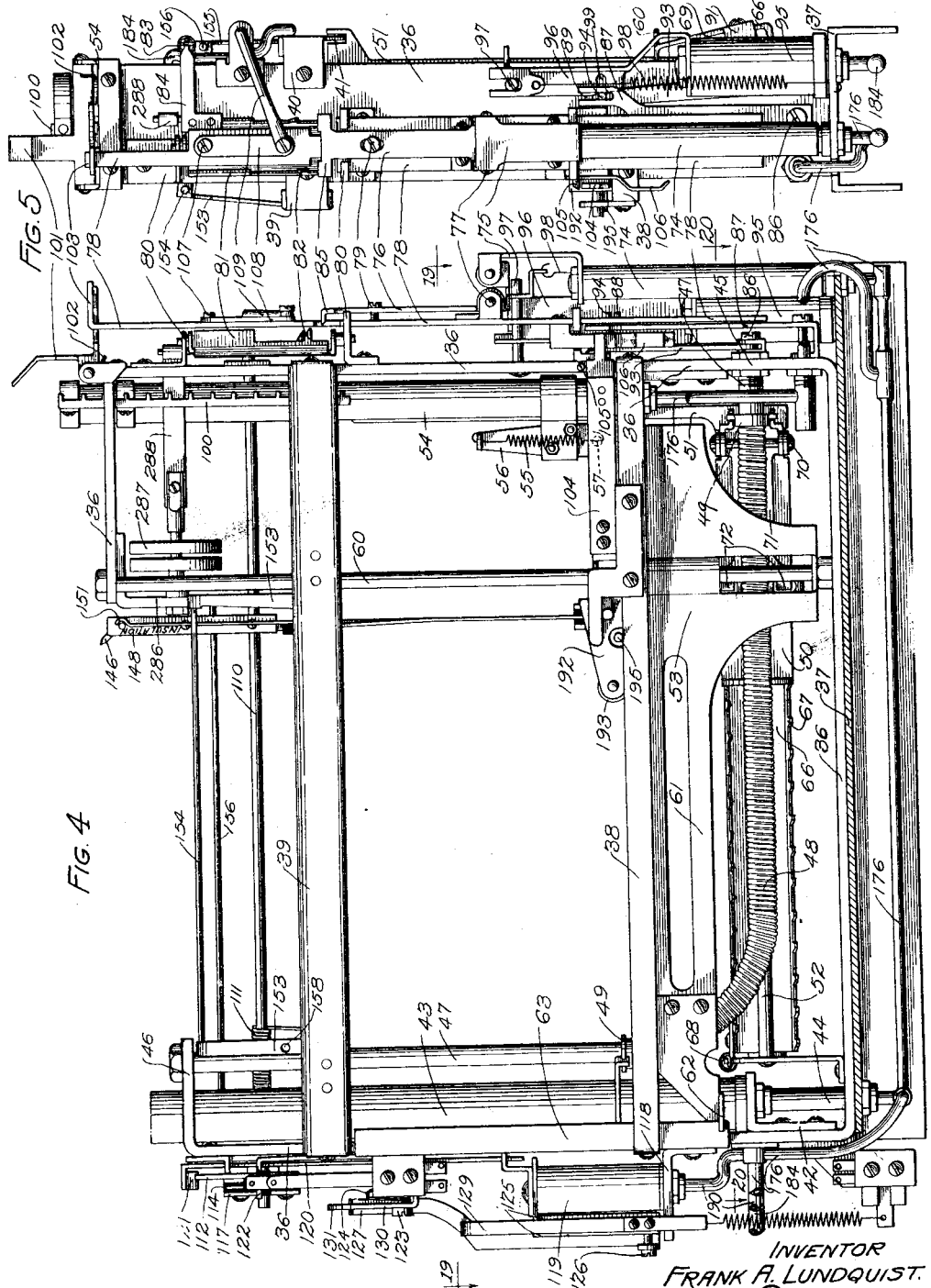

Nov. 25, 1924.
F. A. LUNDQUIST
1,516,539
SELECTOR AND CONNECTIONS
Filed Sept. 27, 1920    10 Sheets-Sheet 4
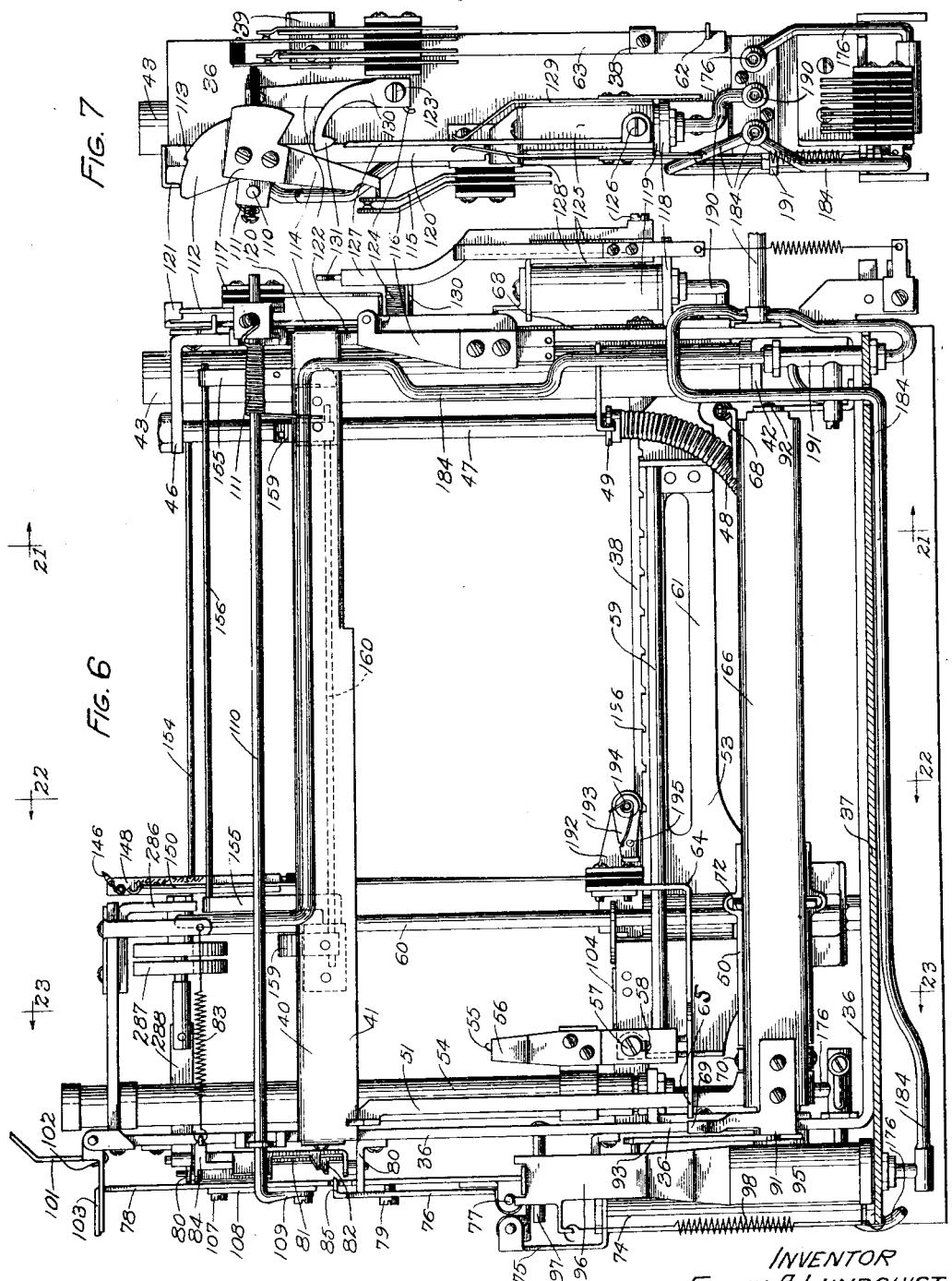
INVENTOR
FRANK A. LUNDQUIST.
By Casper L. Redfield
ATTY.

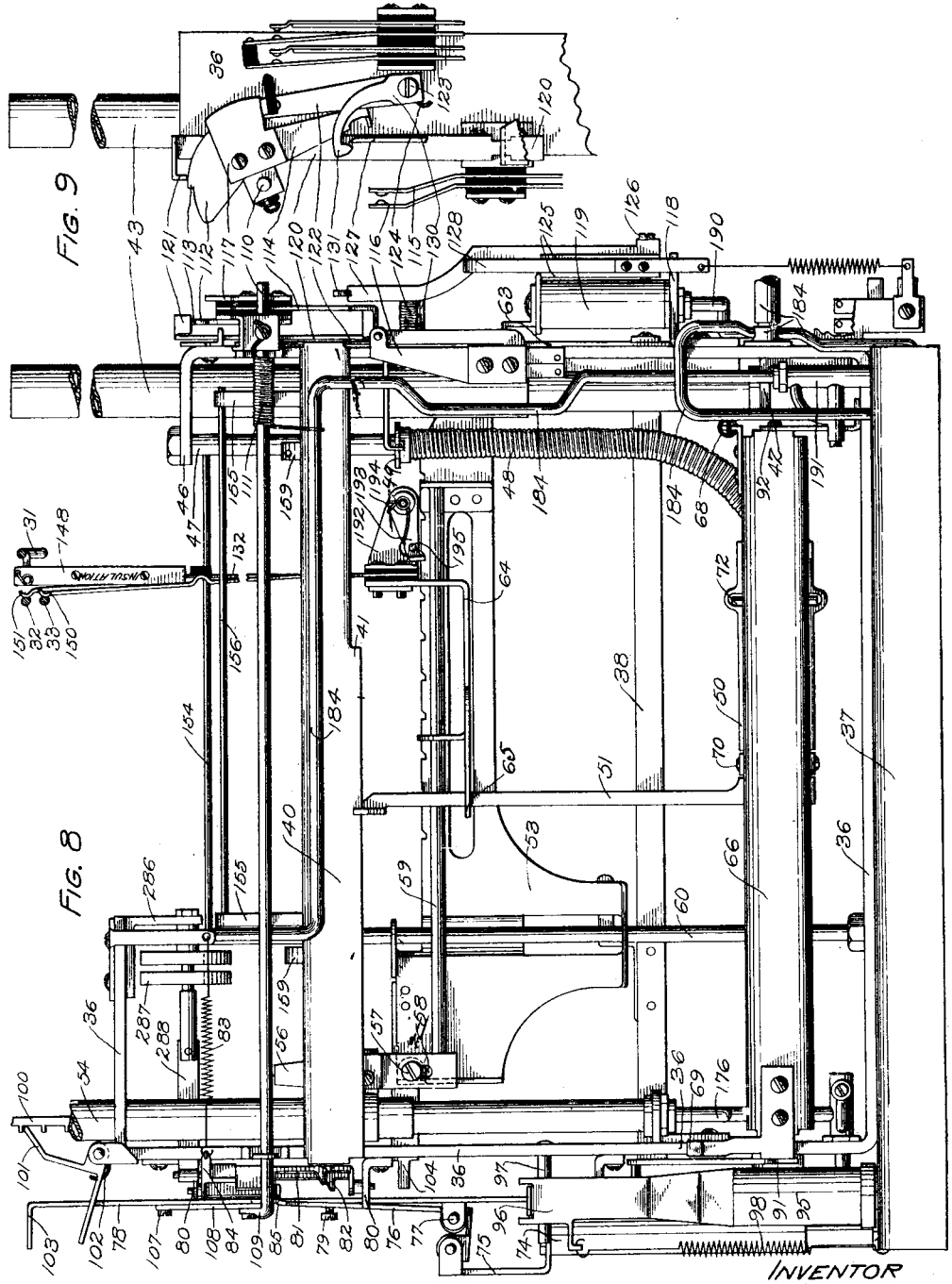

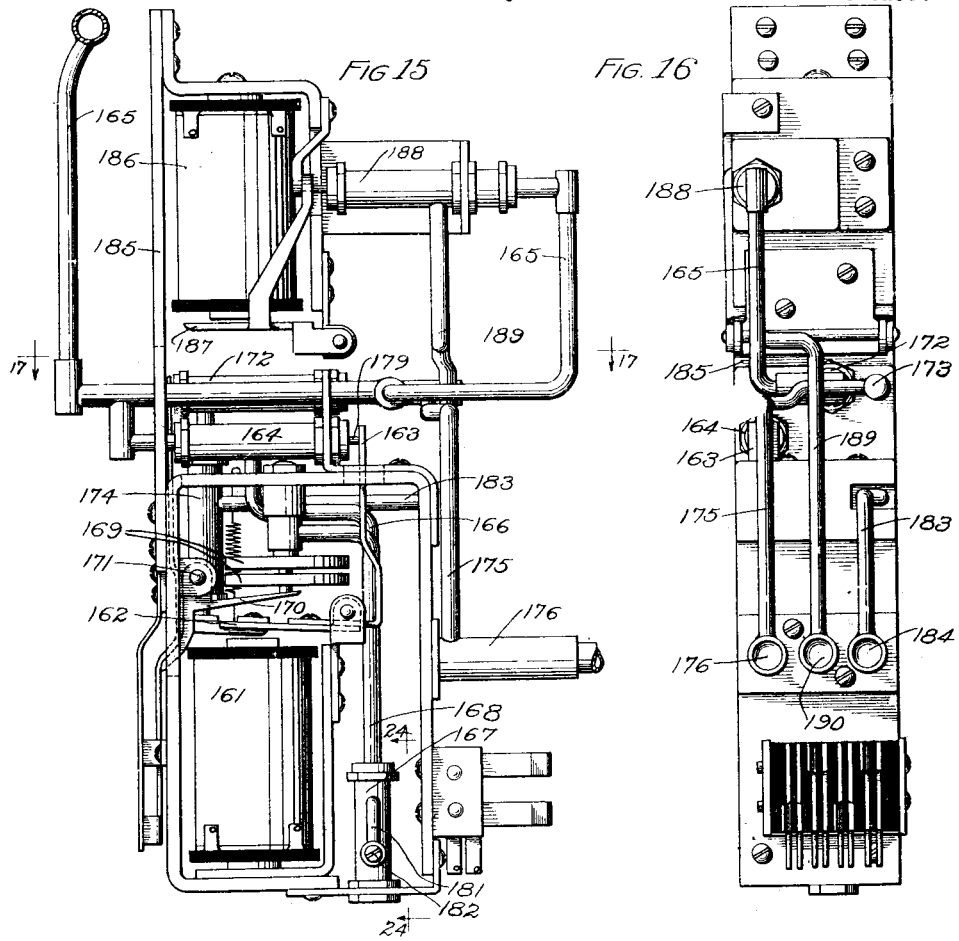
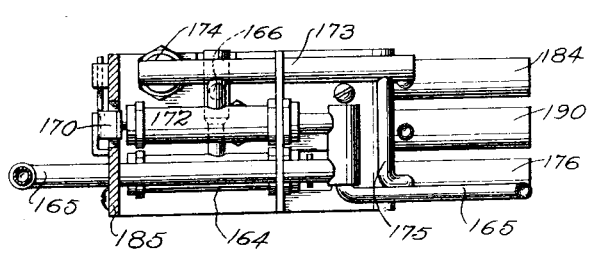
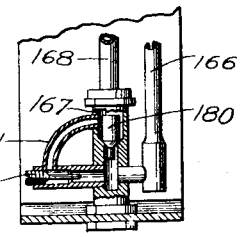

Nov. 25, 1924.
F. A. LUNDQUIST
1,516,539
SELECTOR AND CONNECTIONS
Filed Sept. 27, 1920
10 Sheets-Sheet 7
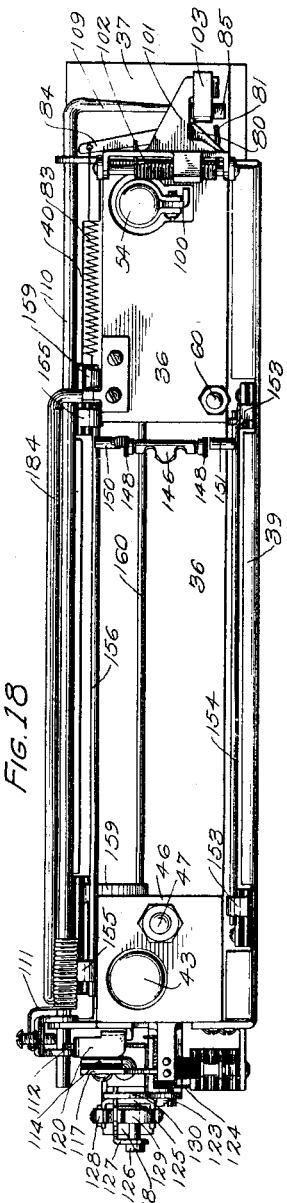
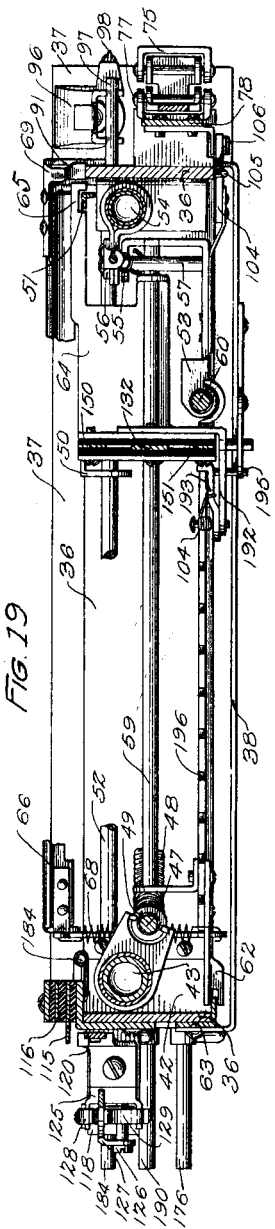
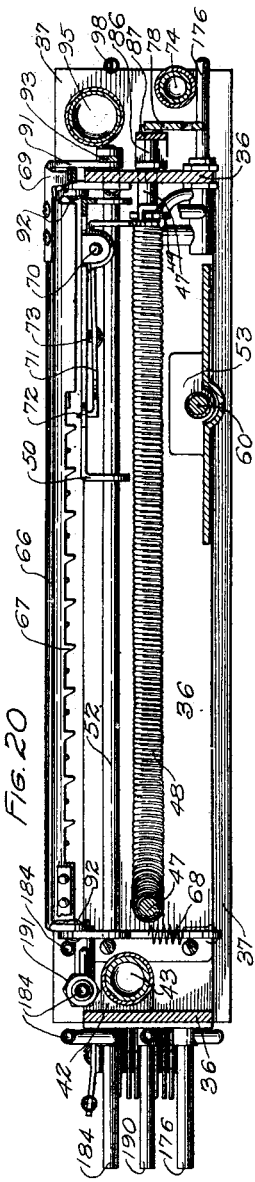
INVENTOR
FRANK A. LUNDQUIST.
By Casper L. Redfield
ATTY.

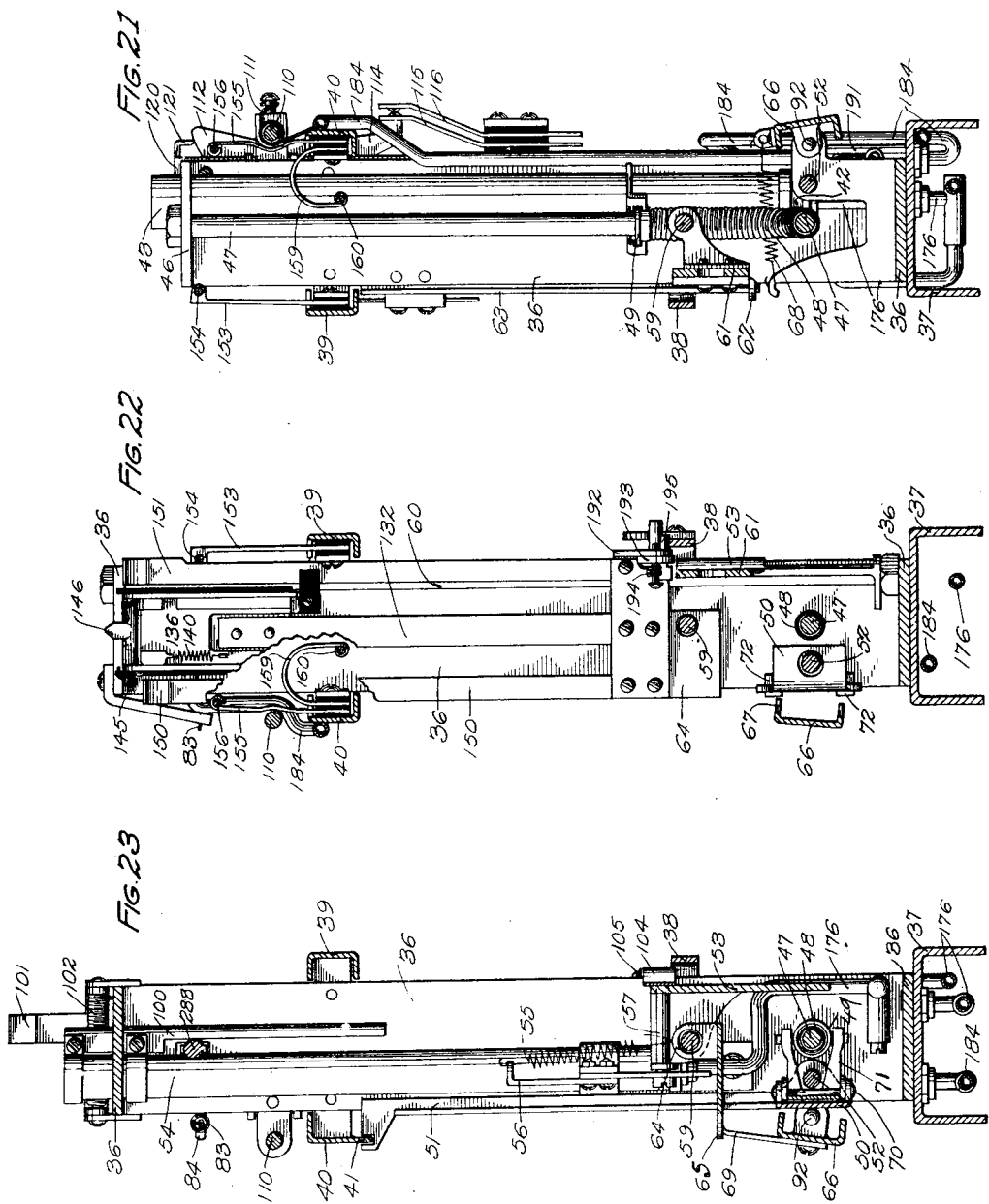

Nov. 25, 1924.  1,516,539
F. A. LUNDQUIST
SELECTOR AND CONNECTIONS
Filed Sept. 27, 1920    10 Sheets-Sheet 9
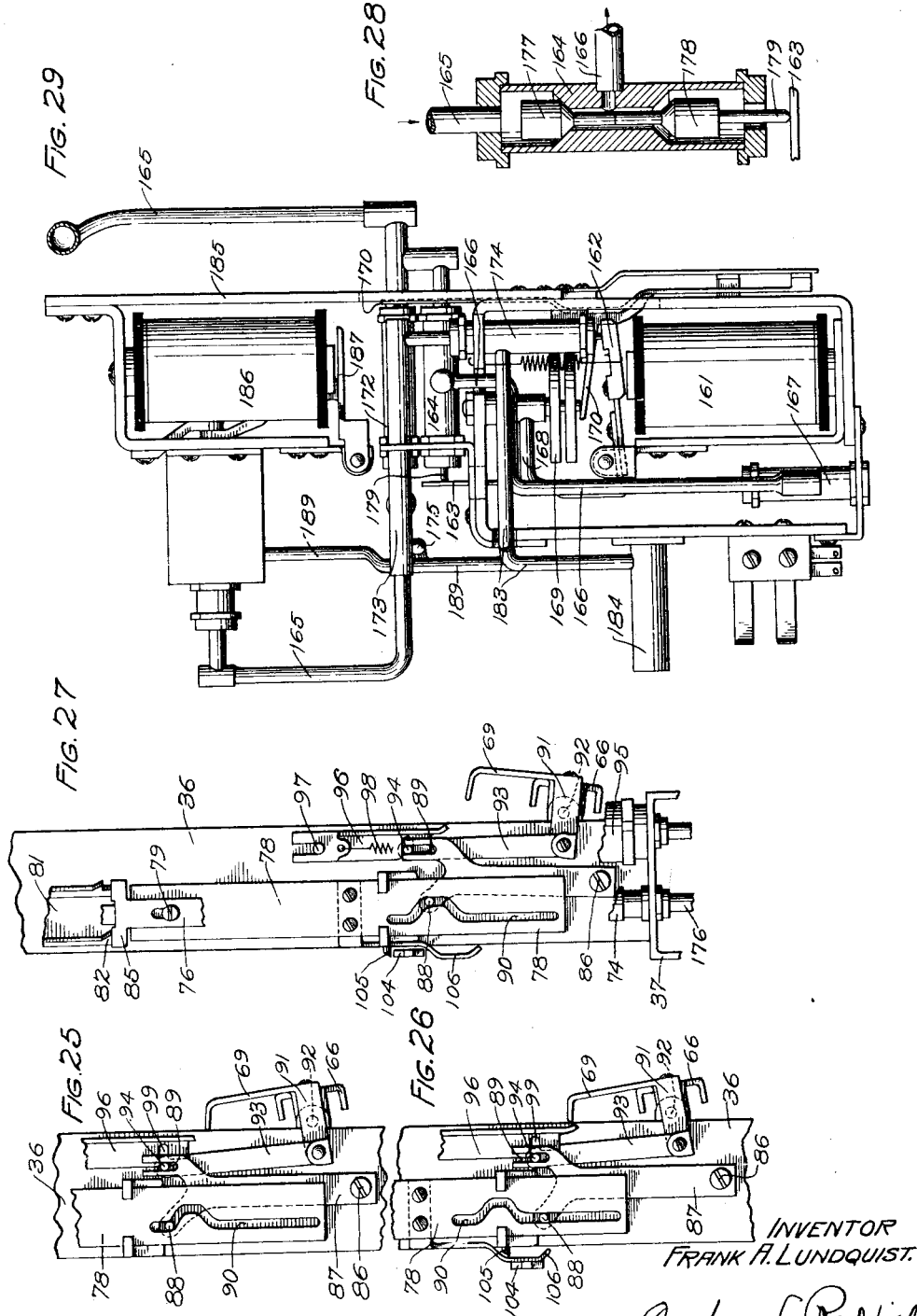
INVENTOR
FRANK A. LUNDQUIST.
By Casper L. Redfield
ATTY.

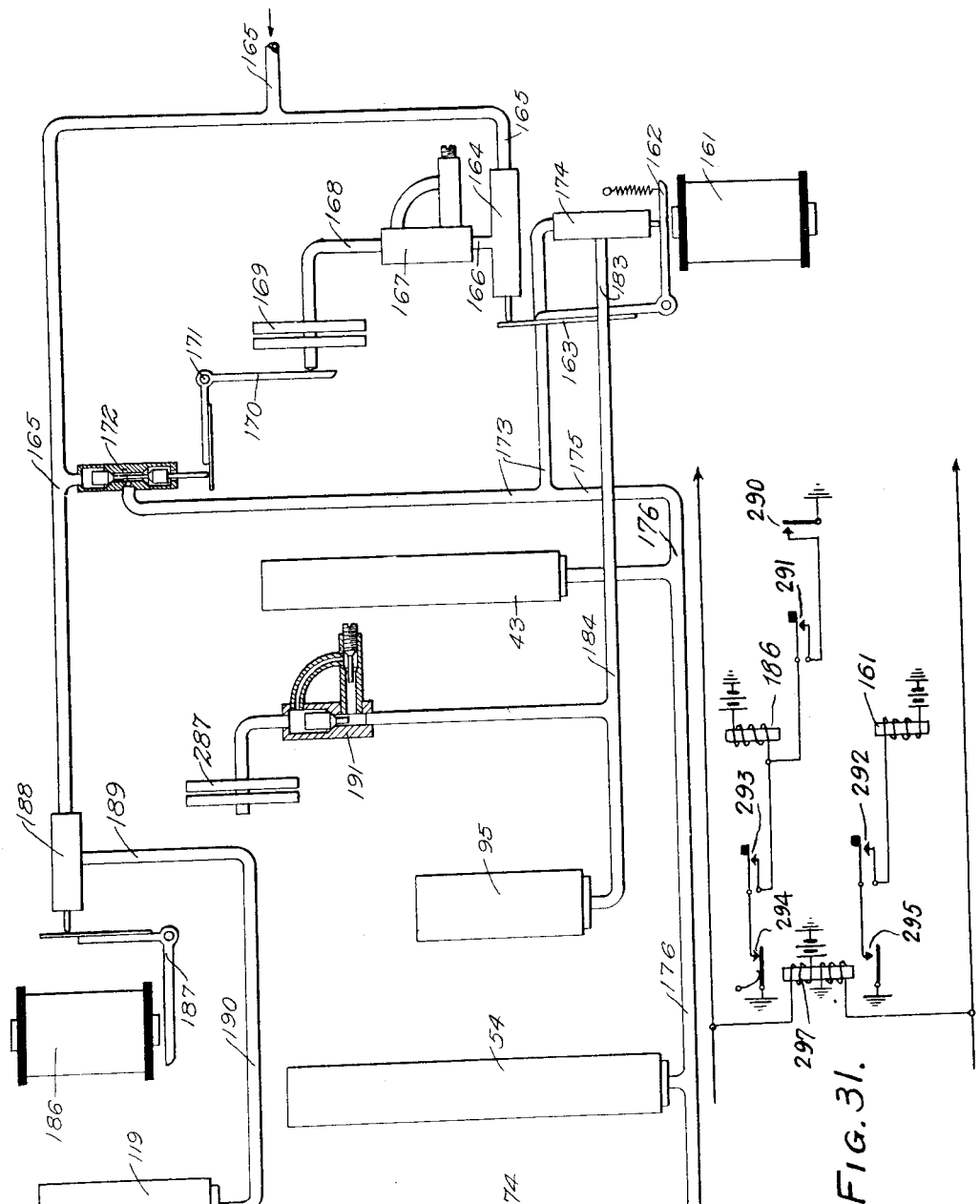

Patented Nov. 25, 1924.

1,516,539

UNITED STATES PATENT OFFICE.

FRANK A. LUNDQUIST, OF CHICAGO. ILLINOIS, ASSIGNOR, BY MESNE ASSIGNMENTS, TO HENRY S. CONRAD, TRUSTEE.

SELECTOR AND CONNECTION.

Application filed September 27, 1920. Serial No. 412,915.

*To all whom it may concern:*

Be it known that I, FRANK A. LUNDQUIST, a citizen of the United States of America, and a resident of Chicago, county of Cook, and State of Illinois, have invented certain new and useful Improvements in Selectors and Connections, of which the following is a specification.

My invention relates to automatic telephone exchanges, and more particularly to the selector and associated mechanical devices by which connections are extended from the line switch to a connector. Certain electrical devices are involved in the present case, but electrical circuits as such are not a part of the invention claimed herein. They are referred to only for the purpose of making clear certain mechanical operations.

In the accompanying drawings

Fig. 1 is a plan of the bank connections which are engaged by the selector;

Fig. 2 is a rear elevation of Fig. 1;

Fig. 3 is an enlarged transverse section of the bank connections;

Fig. 4 is an elevation of the left hand side of the selector in normal position;

Fig. 5 is a front elevation of the same;

Fig. 6 is an elevation of the right hand side;

Fig. 7 is a rear elevation;

Figs. 8 and 9 correspond to Figs. 6 and 7 but with the parts in operated position;

Fig. 10 is an enlarged rear elevation of the contact makers;

Fig. 11 is a side elevation of Fig. 10;

Fig. 12 is a section on line 12—12 of Fig. 10, looking in a direction opposite to that shown in Fig. 11;

Fig. 13 is a similar section, but with the parts in operated position;

Fig. 14 is a side elevation corresponding to Fig. 13;

Fig. 15 is a side elevation of the magnets and associated devices which are conveniently connected to the left hand end of Fig. 4;

Fig. 16 is a front elevation of Fig. 15;

Fig. 17 is a section on line 17—17 of Fig. 15;

Fig. 18 is a plan of Fig. 4;

Figs. 19 and 20 are sections on lines 19—19 and 20—20, respectively, of Fig. 4;

Figs. 21, 22 and 23 are sections on correspondingly marked lines of Fig. 6;

Figs. 24, 25, 26, 27 and 28 are details;

Fig. 29 is the opposite side of Fig. 15;

Fig. 30 is a diagram of the air connections; and

Fig. 31 is a circuit diagram which may be used to control the operation of the selector which is diagrammatically shown in Fig. 30. Instead of the circuit diagram shown in Fig. 31, any well-known selector circuit arrangement may be used.

The bank connections consist of a series of crank shafts 31, with each of which there are associated two wire conductors 32 and 33. These are all insulated from each other and are supported in a frame 34. At one end the shafts 31 have thereon springs 35 which act to hold said shafts at their normal position, and return then to their normal position after they have been moved and released. This normal position may be the horizontal position shown in Figs. 1 and 2, but for reasons which will be given hereinafter, it is preferable to have the normal position to be one which is an advance of about thirty degrees above the horizontal, as shown in Fig. 3.

The frame of the selector consists of a bar of flat iron 36 suitably bent and mounted upon a channel iron base 37. The upright parts of the bar 36 are connected together by ties 38, 39 and 40, one of which has a lip 41 which serves as a guide.

Mounted upon a bracket 42 (Fig. 4) secured to the frame 36 is a motor which consists of an inner tube secured to said bracket, and an outer tube 43 which has its upper end closed and which slides telescopically upon the inner tube when air is admitted to the inner tube thru a pipe 44. There are other motors of the same type in this apparatus, each of which will be designated by a reference character applied to the outer tube. Similar motors have been illustrated in detail by me in several of my pending applications, as in Serial Number 248,104, filed August 3, 1918.

Secured to the frame 36 at 45 and 46 is a round bar 47 bent so that one part is horizontal and the other part is vertical. Loosely mounted so as to slide on bar 47 is a helical coil of wire 48. The ends of this coil are secured to collars 49, one of which is connected to the motor 43 which moves vertically, and the other of which is connected indirectly to a carriage 50 which is mounted to slide horizontally on a guide rod 52, and has an arm 51 which engages guide 41. The coil 48 is a flexible connection between the horizontal motor 43 and the horizontal carriage 50, and one which can be used for both pulling and pushing. When the horizontal motor 43 rises, the horizontal carriage 50 moves to the right, as seen in Fig. 6, and when the horizontal motor 43 falls, the carriage 50 returns to normal position. The coil 48 sliding on the rod 47 serves to change vertical movement into horizontal movement.

Another carriage 53 is connected to another motor 54 by means of a spring 55 having one end attached to a bracket 56 on the motor 54 and the other end attached to a pin 57 on the carriage 53. The spring 55 is a yielding connection between the vertical carriage 53 and vertical motor 54. The pin 57 passes thru a slot 58 in the bracket 56 and the length of this slot serves as a limit to the yield of the spring 55.

The vertical carriage 53 slides upon a vertical rod 60, and has a horizontal arm 61 provided with lips 62 which engage a vertical guide 63 at the left in Fig. 4. On the vertical carriage 53 is a horizontal rod 59, and on this rod is a third carriage 64 which has an arm 65 which embraces and slides upon the arm 51 of carriage 50. When the horizontal carriage 50 moves to the right as seen in Fig. 6, the wiper carriage 64 is moved horizontally on rod 59, and when the vertical carriage 53 rises, the wiper carriage 64 is moved vertically on arm 51.

Pivoted at 92 (Figs. 25 to 27) on suitable brackets supported on the frame 36 is a horizontal channel 66 which has ratchet teeth 67 cut in its flanges. A spring 68 and a stop arm 69 normally hold this ratchet bar 66 in the position shown in Figs. 21, 22 and 23. Pivoted at 70 on the horizontal carriage 50 is a lever 71 which has one arm connected to the coil 48 (Fig. 20) and the other arm terminating in pawls or dogs 72 which extend thru an opening in the carriage 50 and engage teeth 67 on bar 66. When the parts are in normal position, the weight of horizontal motor 43 acts thru the coil 48 to push the carriage 50 to the right as seen in Fig. 20 until said carriage is stopped by contact with the frame or other stationary part of the mechanism. This weight also acts to hold the pawls or dogs 72 normally clear of the teeth 67. A screw 73 serves to limit this withdrawal of dogs 72. When the motor 43 rises it pulls upon the coil 48 to turn lever 71 on its pivot 70 and cause dogs 72 to engage teeth 67 on bar 66. Such action stops the rise of the motor 43 at the beginning of its movement and leaves the parts under tension between the air pressure in motor 43 and the engagement between dogs 72 and teeth 67.

At the right in Figs. 4 and 20 is a motor 74 provided with a bracket 75 which engages the horizontal arm of a lever 76 pivoted at 77 on a slide 78, which is guided in suitable brackets secured to the frame 36 (Figs. 4, 5 and 6). When the parts are in normal position the outward movement of lever 76 is limited by a screw 79 in the slide 78. Pivoted on brackets 80, and located behind slide 78, is a vertical channel 81 having teeth 82 cut in its flanges. A spring 83 secured to an arm 84 on channel 81 holds said channel so that the tooth 82 at the left in Fig. 5 will be engaged by the corresponding dog 85 on the upper end of the lever 76 when said lever is acted upon by the rising of control motor 74.

Secured to a bracket 286 on the upper part of frame 36 is a sylphon 287, which is a short stroke motor in the form of a compound diaphragm. When compressed air is admitted to the sylphon it expands, and when the air is exhausted the sylphon contracts to the position shown in Fig. 4. Attached to the movable part of the sylphon 287 is a connecting rod 288 which has its outer end connected to the arm 84 on the channel 81. When the control motor 74 operates, its rise is stopped by a dog 85 engaging the lower tooth 82 on the channel 81. If the sylphon 287 then operates, the channel 81 is turned on its pivots to remove the lower tooth 82 and bring the other one in the path of the other dog 85 on lever 76. This permits the control motor 74 to rise further and carry the slide 78 with it.

Pivoted at 86 on the frame 36 back of the motor 74 (Figs. 25, 26 and 27) is an arm 87 which has a pin 88 and a slot 89 in its upper end. The pin 88 projects into a cam slot 90 in the slide 78. This slot is so constructed that at the lowest and at the highest positions of the slide 78 (Figs. 25 and 26) the arm 87 will be moved to the left on its pivot 86. At the intermediate position of the slide 78 the cam slot 90 causes the arm 87 to move to the right.

The stop arm 69 on the channel 66 has a branch arm 91 which extends beyond the pivot 92 and has pivotally connected thereto an arm 93 having at its upper end a pin 94 which projects into the slot 89 in arm 87. It will be obvious that a swinging of the arm 87 on its pivot will cause a corresponding swinging of arm 93 on its pivot.

Adjacent to the motor 74 is another motor 95 (Figs. 5, 6, 20 and 27) on the top of which is a bracket 96 having its upper end guided by a slot therein engaging a pin 97 in frame 36. A spring 98 serves to retract the escapement motor 95 to its lower or normal position after it has been moved by the admission of compressed air to its interior.

In the bracket 96 is a slot 99 which is located adjacent to pin 94 in arm 93. When all parts are in normal position, the pin 94 is adjacent to but not in the open end of slot 99 (Fig. 25). When the motor 74 raises the slide 78 until stopped by dog 85 engaging the lower tooth 82 on channel 81, the cam surface in slot 90 acts on pin 88 to move lever 87 so as to push the pin 94 into slot 99. If the motor 95 now rises, the upward movement of bracket 96 will cause arm 91 to turn on its pivot 92 and thereby oscillate channel 66. When an oscillation of the channel 81 permits the motor 74 to rise still higher, the pin 94 is withdrawn from the slot 99, as shown in Fig. 26, and movement of motor 95 will have no effect upon channels 66.

Secured on the side of the vertical motor 54 is a toothed bar 100 (Figs. 4 and 18), and pivoted on the upper part of the frame 36 near this motor, is a bell crank lever 101, provided with a spring 102 which acts to move the vertical end of the bell crank 101 to engagement with bar 100 when the motor 54 has risen. The upper end of slide 78 is provided with a hook 103 which normally engages the horizontal arm of bell crank 101 and holds the vertical arm from bar 100. But when motor 74 rises after motor 54 has risen, the dog or pawl of bell crank 101 engages bar 100 to hold motor 54 in elevated position after air has been exhausted therefrom.

On vertical carriage 53 (Figs. 4 and 19) is a spring arm 104 which projects under a pin 105 in frame 36 and adjacent to a cam 106 secured to slide 78 (Figs. 26 and 27). Normally, the pin 105 prevents the motor 54 from raising carriage 53, but after the motor 74 has raised the slide 78 to its highest position, the cam 106 pushes the spring arm 104 from under the pin 105, and the motor 54 is free to raise carriage 53.

Pivoted at 107, on the upper part of slide 78, is a link 108, the lower end of which is connected to an arm 109 on a transverse shaft 110. A spring 111 on the other end of shaft 110 acts to move the slide 78 toward its lowest position. On the shaft 110 near spring 111 is a disk 112 provided with a shoulder 113; an arm 114 which serves to close contact springs 115 and 116; and a section of another disk 117 which serves to control the contact springs shown in the upper right hand part of Fig. 7.

On a bracket 118 (Figs. 4, 6 and 7) is a motor 119 which moves a slide 120 having a hook 121 on its upper end. When the release motor 119 is in its lower (normal) position, the hook 121 is in the path of the shoulder 113 and prevents the motor 74 rising to its highest position until after motor 119 has operated. But when the release motor 119 lifts the hook 121 clear of shoulder 113, the motor 74 advances shaft 110 till the section of disk 117 is clear of the upper end of an arm 122 pivoted at 123 on frame 36. When this occurs, a spring 124 moves the arm 122 under the cut away part of 117 and permits the parts to assume the position shown in Fig. 9.

Secured on the release motor 119 is a plate or bracket 125, on a pin 126 in which is pivoted a bar 127 which is normally held in mid-position by springs 128 and 129. On the pivot 123, and secured to or solid with the arm 122, is another arm 130 having a hook 131 on its end. When the disk 117 holds arm 122 in its normal position, the hook 131 is in such a position that the upper end of bar 127 will miss the hook 131 when the motor 119 rises. But after the disk 117 has released arm 122, the hook 131 is moved over into the path of the bar 127, as shown in Fig. 9. If the motor 119 rises when the parts are in this position, then the bar 127 will engage hook 131 and move it and arm 122 to release disk 117 and permit spring 111 to return the associated parts to normal position.

Secured to the carriage 64 over the guide rod 59 is a vertical insulated bar 132 having a head 133 secured thereto by screws 134. The head 133 is a broad plate, the sides 135 of which are bent up to form a channel arranged to hold a slide 136 (Figs. 10 to 14). Secured to the sides 135 are guides 137, 138 and 139 which serve to hold the slide 136 in position. A spring 140 connected to the guide 138 and slide 136 serves to normally retain said slide at its upper position with a stop 141 thereon in contact with a flange 135. Mounted in the upper end of the sides or flanges 135 is a shaft 142 having a cam 143 for engaging a lug 144 on slide 136. A spring 145 on shaft 142 serves to keep cam 143 in contact with lug 144. Also on shaft 142 is an arm 146 arranged to engage one or another of the cranks on the crank shafts 31 of the bank connections, and a stop arm 147 for engaging the guide block 138 to limit the movement of the shaft 142 when the arm 146 engages a crank shaft 31. Secured to the outer faces of the flanges 135 are pieces of insulation 148, and secured to the lower parts of the slide 133 are laterally projecting pieces of insulation 149.

Insulatingly secured to the wiper carriage 64 on opposite sides of the bar 132 are contact makers 150 and 151 which have cam surfaces 152 adjacent to the pieces of insulation 149. The contact makers 150 and 151 are of spring metal and have a slight initial tension which keeps them in contact with the pieces or blocks 149. In this position the contact makers are adjacent to the insulations 148, and are between the front and rear faces of the parts carried by the bar 132, as shown in Fig. 11.

Figs. 12 to 14 correspond in position (direction of view) with Fig. 3, but are at a larger scale. The distance between the conductors 32 and 33 on one side, and the associated crank shaft 31 on the other, is such that the parts carried by bar 132 pass freely between them. But the arm 146 projects out on one side so that when the rising carriage 64 brings it to a crank shaft 31 which is in its normal position, the said arm 146 engages the crank on the shaft to turn it to the vertical position shown in Figs. 13 and 14, the shaft 142 being turned by the same action until stopped by arm 147 engaging the guide block 138 on the head 133. This last action arrests the upward movement of the carriage 64.

The turning of the shaft 142 as a result of arm 146 engaging a crank on a shaft 31 causes cam 143 to depress the slide 136 against the action of spring 140, and this depression moves the pieces 149 over the cams 152 and deflects the contact makers 150 and 151 so as to bring them into contact with the conductors 33 and 32 as shown in Fig. 14.

Insulatingly supported on the tie 39 (Figs. 4, 18, 21 and 22), are standards 153 which carry a conductor 154, and similarly supported on tie 40 are standards 155 which carry a conductor 156. At the places where these conductors come, the contact makers 150 and 151 are cut away as shown at 157 in Fig. 10. When the carriage 64 is in its lowest position, it can move horizontally without the contact makers rubbing upon the conductors, but when the carriage 64 rises in a movement to find an idle trunk (which means a crank shaft in its normal position), the edges of the contact makers engage the conductors to make electrical connections between them. Wires coming from a local station thru a line switch are connected to the standards 153 and 155, as shown at 158 in Fig. 4, with the result that when the contact makers engage a pair of wires 32 and 33, the local station has its electrical connections extended to those wires.

Also, insulatingly supported on the tie 40 are spring arms 159 which carry a conductor 160 arranged to make a similar electrical connection with the bar 132 for controlling the operation of the selector.

Referring to Figs. 15, 16, 17, 29 and 30, the magnet 161, the circuit for which is not a part of the present invention, and consequently is not illustrated, is the first thing operated and attracts its armature 162. When so attracted, the vertical arm 163 opens valve 164 and permits compressed air to flow from the supply pipe 165 thru valve 164, pipe 166, check valve 167 and pipe 168 to sylphon 169. The admission of air to the sylphon 169 causes it to expand and move bell crank lever 170 pivoted at 171. The other arm of lever 170 opens valve 172 to permit air to flow from the supply pipe 165 thru pipe 173 to valve 174 and, by way of a branch 175, to the manifold 176. The valve 174 is controlled by the armature 162, and is open when the armature is in its retracted position. But when the armature 162 is attracted to permit the operations just described as resulting in letting air reach valve 174, the said valve 174 closes by the withdrawal of the armature 162.

All of the valves are alike in construction and are indicated by a character applied to the valve casing. The valve 164 is shown in enlarged section in Fig. 28. It consists of the casing 164 provided with inlet pipe 165 and outlet pipe 166. Inside of the casing are two valve bodies 177 and 178, the latter of which has a projecting stem 179 engaged by the arm 163. In the position shown in Fig. 28, no air can flow from pipe 165 to 166, but when arm 163 lifts the body 178 it also lifts 177 and permits such flow of air. When later the arm falls, the air pressure returns the valve bodies to the position shown, and air in pipe 166 is exhausted thru the space around stem 179.

The check valve 167 is shown in enlarged section in Fig. 24. An inspection will show that compressed air may flow freely from pipe 166 to 168 past the check 180, but that in return direction it must flow thru the by-pass 181, in which there is an adjusting screw 182. This screw is set up so as to check the exhaust flow, and make such flow sluggish. It will be evident that when air is admitted to and exhausted from pipe 166 by rapid pulsations, the sylphon 169 on pipe 168 will be expanded on the first pulsation and will stay expanded because air will not have time to escape past screw 182 before another pulsation admits more air. But if there is a pause at the exhaust phase, then the air will have time to escape from the sylphon, and it will return to normal position.

From the valve 174 there is a pipe 183 which leads to a manifold 184.

The magnet 161 and associated parts are held in a frame 185, and also supported in this frame is another magnet 186 whose armature 187 serves to open valve 188 when a current flows thru said magnet. From the valve 188 a pipe 189 extends to manifold 190. The manifolds 176, 190 and 184 connect to pipes on the selector, and for convenience these pipes are given the same numbers on Figs. 4, 8, 20 and other places where they show.

By inspection of Figs. 4, 5, 7 and 27 it will be seen that the pipe 176 leads to motors 43, 54 and 74. Consequently, when a circuit is closed thru magnet 161, air pressure is applied to these motors. The motor 43 is connected to coil 48 which has its other end connected to lever 71 which has thereon the dogs 72. The initial rise of motor 43 puts a strain on the coil 48 and throws a dog 72 into engagement with one of the teeth 67 on channel 66. As a consequence, the rise of motor 43 is arrested by its own action.

The motor 54 puts a tension on spring 55 to raise carriage 53, but the spring arm 104 under the pin 105 prevents this carriage rising at this time. The motor 74 tilts the lever 76 to throw a dog 85 under a tooth 82 on channel 81, and raises slide 78 until there is an engagement between dog and tooth. From the foregoing it will be seen that an attraction of the armature 162 of magnet 161 puts air pressure on motors 43, 54 and 74 to move them, but that all of said motors are restrained from effective movement until other things happen.

By inspection of Figs. 6, 7 and 30 it will be seen that pipe 184 has one branch leading to motor 95, and another branch leading to the sylphon 287. The branch leading to the sylphon has therein a check valve 191 with by-pass and regulating screw like those shown in Fig. 24. Consequently, sylphon 287 is quick to act but slow to return.

In automatic telephone exchanges, a switch is seized by an impulse being sent thru some magnet thereon, as magnet 161. The circuit for such a magnet is ordinarily closed automatically, and thru intermediate apparatus between the local station and the selector. But as those things are not a part of the present invention we may assume that the circuit for magnet 161 in the seizing operation is closed manually. After the selector is seized, the succeeding operation is by a series of rapid impulses followed by a pause. The matter here under consideration is the effect of such impulses and pause upon the selector.

When the switch is seized, the current thru magnet 161 results in air pressure being applied thru pipes 173 and 176 to motors 43, 54 and 74. On the pipe 173 is valve 174 which permits air to flow thru pipes 183 and 184 to the escapement motor 95 and sylphon 287. But the attraction of the armature 162 which put air pressure on pipe 176, permits valve 174 to close so as to shut air pressure from pipe 184.

If now a series of impulses flow thru magnet 161, by beginning with a break of the circuit followed by a remake, then the armature 162 will be vibrated by being retracted and then attracted a series of times. This vibration closes and opens valve 164 in rapid succession, but as there is the check valve 167 in the pipe leading from this valve to the sylphon 169, that sylphon is unaffected by these impulses, and pressure is maintained on pipe 176 and connected motors. But the vibration of armature 162 opens and closes valve 174 in rapid succession, and air pulsations are conveyed to pipe 184. The motor 95 on this pipe is constructed to respond to these pulsations, and to rise and fall in unison therewith. But in the branch which leads to the sylphon 287 there is the check valve 191 which permits the sylphon to advance in response to the first pulsation but prevents a return in the brief interval between one pulsation and the next.

When air pressure is applied to motor 74 in the manner previously described, it rises until stopped by a dog 85 engaging a tooth 82 of channel 81. This rise lifts slide 78 a short distance and causes the cam in slot 90 to act on pin 88 to swing arm 87 and cause pin 94 to enter slot 99. When the sylphon 287 expands it moves channel 81 so as to shift the stopping of slide 78 from one tooth 82 to the next one on the opposite flange. This permits the slide 78 to rise slightly but not enough to displace the pin 88 with respect to the cam in slot 90.

When air pulsations are applied to motor 95 after pin 94 has entered slot 99 as described, the rise and fall of said motor vibrates the channel 66 a number of times which corresponds to its own rise and fall. This vibration of the channel 66 acts as an escapement to permit the motor 43 to move the carriages 50 and 64 horizontally step by step from normal position.

When the series of impulses thru magnet 161 terminates, current remains on that magnet 161 and its armature remains attracted. As a consequence air pressure remains on pipe 176 and its connected motors, but air is shut from the escapement motor 95 and from the sylphon 287 with the result that this sylphon retracts and turns the channel 81 to release the last tooth 82 thereon from dog 85. This permits the motor 74 to rise until the turning of the shaft 110 brings the shoulder 113 on disk 112 against the hook 121 on slide 120. This last rise of motor 74 moves the slide 78 to the position shown in Fig. 26 and consequently moves the pin 94 out of the slot 99. This last rise of the motor 74 causes cam 106 to move spring arm 104 from pin 105, and this permits motor 54 to raise carriage 53 to carry upward carriage 64 and parts attached thereto.

On a bracket 192 secured to carriage 64 is a pawl 193 which is depressed by a spring 194 connected thereto. A pin 195 on pawl 193 strikes tie 38 to lift the pawl from engagement with teeth 196 on carriage 53 when said carriage is in its lowest position. But as soon as carriage 53 moves upward the pawl 193 drops into teeth 196 and prevents the carriage 64 from moving backward until said pawl is released.

The upward movement of motor 54 continues until the arm 146 engages a crank on crank shaft 31 and stops the carriage 64 as previously described. In this stopping operation the crank shaft is turned so that all cranks on the shaft point upward as does the one shown in Figs. 13 and 14. If some other selector opposite some other vertical row of cranks in the same longitudinal vertical plane sends its contact makers upward it will not engage a crank on a shaft so turned but will continue on until it comes to some other shaft in normal position, which other shaft will thereby be turned so as not to be engaged by some third selector moving upward in the same plane. In other words, the turning of a shaft by a selector moving its contact makers upward until its arm 146 engages a crank thereon is a means for selecting an idle shaft, otherwise known as selecting an idle trunk.

As shown in Fig. 1, there is a series of cranks on each shaft, and the number of such cranks on a shaft is equal to the number of selectors used in a group. In automatic telephone exchanges, the different selectors of a group move independently of each other, and while it is theoretically impossible that two rising selectors should be at exactly the same elevation at the same instant, still two may be so near together that one is only slightly behind the other. To prevent two selectors engaging cranks on the same shaft it is desirable to have the first or leading selector move the shaft so that the other cranks thereon wil be removed quickly from the paths of other selectors. The path of a crank pin when engaged is an arc of a circle, and that part of the crank pin movement which clears it from the path of a rising arm 146 is the upper part of this arc. By making the crank positions as shown in Fig. 3, instead of as shown in Fig. 2, the turned shaft is more quickly changed from idle to busy position.

The engagement between an arm 146 and the crank it turns is utilized to close the springs 290, thereby sending an impulse of current through the springs 291 to the magnet 186. See Figs. 30 and 31. The engaged shaft, the bar 132, and the conductor 160 also form a part of the circuit for this magnet. The operation of magnet 186 opens valve 188 and permits air to flow from the supply pipe 165 through connections 190 to the motor 119. The operation of this motor raises the hook 121 from the shoulder 113 and permits the motor 74 to turn shaft 110 far enough to move disk 117 from lever 122 and to permit said lever to move to the position shown in Fig. 9. In so moving, the contact springs 292 are permitted to open. By having the circuit for magnet 161 controlled through these springs, and the circuit of the magnet 186 controlled through the trunk selecting operation, (springs 291) these actions break the circuits for said magnets, and that in turn shuts air from all motors, because air is admitted to those motors only by the operation of said magnets. The parts, however, are held in advanced position by reason of the end of the lever 122 being under the cut away part of the disk 117.

To release the parts and permit them to return to normal position, another impulse is sent through magnet 186. This is the indirect result of the replacement of the receiver at the calling substation, which brings about the deenergization of the line relay 297 and the retraction of the slow acting armature 294. In this manner a circuit is completed for the release magnet 186. The operation of magnet 186 again causes motor 119 to rise, but this time the hook 131 is in the path of bar 127 of motor 119, with the result that the bar engages the hook to return lever 122 to normal position. This releases motor 74, which falls back because no air is on it to keep it in advanced position. When the parts are restored to their normal position, the off normal springs 293 are opened and the release magnet 186 deenergizes. In this manner the parts are released.

When motor 54 rose from normal position, the pawl 101 was in position to engage toothed bar 100 and retain said motor in elevated position. When motor 74 falls back it carries slide 78 downward, and the hook 103 thereon releases pawl 101 so that motor 54 may fall back carrying carriages 53 and 64 to their lower position. When this lower position is reached, the pin 195 on pawl 193 strikes tie 38 and lifts pawl 193 from engagement with teeth 196 on carriage 53. In this condition the weight of motor 43 acting thru coil 48 pushes carriage 50 back to its normal position. In this action the dogs 72 are clear of teeth 67 and there is no vibration of the escapement during return movement.

Reviewing the operations briefly, a circuit is closed thru magnet 161, and that circuit stands closed for a period of time until the subscriber at the local station operates his calling device thereat.

The closing of this circuit puts air pressure on motors 43, 54 and 74. The motor 43 locks itself against movement by throwing pawl 72 into teeth 67. The motor 54 is restrained by spring arm 104 being under pin 105. The motor 74 moves a short distance to connect motor 95 to bar 96 and is then stopped by dog 85 engaging a tooth 82.

A series of impulses are then sent thru magnet 161 which result in corresponding air pulses flowing over a different course to expand sylphon 287 and operate motor 95. The motor 95 operates the escapement to permit motor 43 to move the wiper carriage horizontally a predetermined distance.

Upon cessation of these impulses, syphon 287 releases motor 74 so that it may move to disconnect motor 95 and to release motor 54. The motor 54 raises the wiper carriage until parts thereon engage an idle trunk, where-upon an impulse flows thru magnet 186 to admit air to motor 119 which releases motor 74 for a third and final movement. This final movement throws in a locking device to hold parts in moved position and cuts off current from both magnets and air pressure from all motors.

A later operation of magnet 186 and motor 119 releases the lock and permits all parts to return to normal position by gravity or under the action of retracting springs.

In these operations the motor 74 may be considered as a control motor because it connects and disconnects motor 95 which operates the escapement for the horizontal movement, it releases motor 54 which makes the vertical movement, and it brings the locking mechanism into operation to hold the switching apparatus in position after the motors are disconnected.

While a sylphon is a motor which will respond to air pulsations as rapidly as any other motor, both of the sylphons herein shown have a retarding apparatus such as illustrated in Fig. 24. For the purposes of this application a "sylphon" will be considered to be a motor which is quick to act but slow to return.

The motor 119 may be called a release motor. It releases motor 74 for its final advance, and subsequently releases the mechanism so that it may return to normal position.

What I claim is:

1. In a switching mechanism, a motor, an escapement for controlling the operation of said motor, a carriage, a flexible connection in the form of a coil of wire connecting said motor and carriage, means for operating said escapement to allow said motor to move in one direction, said coil of wire communicating each movement of the motor to the carriage to move said carriage in a different direction, and a guide for said coil.

2. In a switching mechanism, a motor, a carriage, a bar having one part parallel with the line of the motor movement and another part parallel with the line of the carriage movement, and a coil of wire slidably mounted upon said bar and having one end connected to the motor and the other end connected to the carriage.

3. A motor, a carriage arranged to be moved thereby, a normally disengaged catch mounted upon the carriage, and a connection between the motor and catch so arranged that a movement of the motor operates the catch to restrain the carriage.

4. A carriage, a ratchet bar, a dog mounted upon the carriage and arranged to co-operate with the ratchet bar but normally disengaged therefrom, a motor connected to the dog so that a movement of said motor to put a strain on the carriage to move it will cause the dog to engage the ratchet and restrain the carriage movement, and means for vibrating said bar so that said motor may move said carriage step by step.

5. A motor, a carriage arranged to be moved thereby, a ratchet bar, a catch mounted upon the carriage, means by which an operation of the motor to move the carriage will cause the catch to engage the bar so as to prevent such movement of the carriage, and means for vibrating the bar so as to permit the carriage to advance step by step under action by said motor.

6. In a switching mechanism, a pneumatic motor for moving part of the mechanism from its normal position, an escapement for controlling such movement, and means by which the co-operating parts of the escapement are disconnected from each other during return to normal of the moved part.

7. In a switching mechanism, a carriage, a pawl mounted thereon, a ratchet with which the pawl co-operates to form an escapement for controlling the carriage, and a motor connected to and operating thru the pawl to move the carriage.

8. The combination with a carriage, a normally disconnected escapement associated with the carriage, and a pneumatic motor serving to connect the escapement and to move the carriage, of a second pneumatic motor for operating the escapement to permit the first motor to move the carriage, and means for controlling the second motor.

9. An ascapement consisting of a pawl and a vibratory part normally disconnected from each other, a motor connected to the pawl and serving to move it to engage the vibratory part to stop the motor movement, a second motor, and means for connecting the second motor to and disconnecting it from the vibratory part.

10. A carriage, a motor for moving said carriage horizontally, a locking device for preventing further horizontal movement of said carriage, a second motor for moving said carriage vertically, and a control motor for controlling said motors and locking device.

11. The combination with a carriage, and devices for moving and holding said carriage, of a motor for controlling the operation of said devices, and a sylphon for controlling said motor.

12. In a switching mechanism, a control motor, a slide operated thereby, means for operating said switching mechanism, a locking device for stopping the operation of said mechanism, and means controlled by said slide for controlling the operation of said mechanism and said locking device.

13. In a switching mechanism, a control motor, a slide moved thereby, connections between the motor and slide so arranged as to arrest the motor and slide upon preliminary movement thereof, means for releasing the arresting connections so that motor and slide may make a second movement, and switch operating devices controlled by the movements of the slide.

14. In combination with switching mechanism, an operating device for moving said mechanism in one plane, a second operating device for moving said mechanism in another plane, a release motor, means for operating said motor to release said operating devices, and means for again operating said motor to release said mechanism.

15. A series of crank shafts each having a series of cranks thereon, said parts being so arranged that the cranks lie in longitudinal and in transverse planes, a switching mechanism provided with an arm arranged to engage a crank and turn it, and means for moving the switching mechanism first in a longitudinal and then in a transverse plane so as to bring about such engagement with a crank in the transverse plane.

16. A series of crank shafts located in one plane, each shaft having a series of cranks thereon arranged so that corresponding cranks on the different shafts are located in planes transverse to the first mentioned plane, all said cranks having normal positions, a switching mechanism movable successively first in said first plane and then in one of said transverse planes, and an arm on said mechanism arranged to engage a crank in normal position and to turn it in the transverse movement of said mechanism, such turning serving to move other cranks on the same shaft from their normal positions.

17. A series of crank shafts having cranks located in planes transverse to the shafts, normal positions for said cranks, a contact maker movable in any one of said planes, said contact maker when moving in one of said planes being potentially capable of engaging any crank in normal position in the plane, means for moving the contact maker in one of said planes, and means controlled by the engagement between said contact maker and a crank for turning the associated shaft and for stopping the movement of said contact maker.

18. A series of crank shafts having cranks located in planes transverse to the shafts, a pair of conductors associated with each shaft, a switching mechanism, a pair of other conductors mounted upon the mechanism, a carriage adapted to be moved into any one of said planes, a pivoted arm on the carriage arranged to engage a crank to turn it and to itself be turned, and a pair of contact makers, said parts being so constructed that upon a crank being turned the associated turning of the arm will cause the pair of contact makers to complete electrical connection between the two pairs of conductors.

19. A pneumatic motor, means for operating said motor, a catch and a ratchet normally disengaged from each other, and means controlled by the operation of said motor for causing said catch to engage said ratchet to arrest the movement of said motor.

20. In a switching mechanism, contact makers, pneumatic motors for moving said contact makers in directions perpendicular to each other, a supply pipe through which air is admitted simultaneously to both motors, restraining devices for holding said motors, a third pneumatic motor connected to a branch of said supply pipe, and means by which the third motor releases the restraining devices successively.

FRANK A. LUNDQUIST.